United States Patent [19]

Kanai et al.

[11] 3,994,753
[45] Nov. 30, 1976

[54] STOP-WELD COMPOSITION AND METHOD FOR PRODUCING ALUMINIUM TUBE IN SHEET UTILIZING THE SAME

[75] Inventors: Tomiyoshi Kanai; Takeshi Katohgi; Hitoshi Akiyoshi, all of Tochigi, Japan

[73] Assignee: Showa Aluminium Kabushiki Kaisha, Osaka, Japan

[22] Filed: May 12, 1975

[21] Appl. No.: 576,732

[30] Foreign Application Priority Data
May 13, 1974   Japan.............................. 49-53678

[52] U.S. Cl. ................................................. 148/22
[51] Int. Cl.² .......................................... B23K 35/22
[58] Field of Search ................................ 148/22–26

[56] References Cited
UNITED STATES PATENTS

| | | | |
|---|---|---|---|
| 2,610,933 | 9/1952 | Stark | 148/26 |
| 3,001,276 | 9/1961 | McGriff | 148/23 |
| 3,428,497 | 2/1969 | Coless | 148/26 |

*Primary Examiner*—Peter D. Rosenberg

[57] ABSTRACT

A stop-weld composition for forming a corrosion inhibiting layer on the internal surface of aluminium tube in sheet comprises 2.0 to 50.0% of boron nitride, 0.2 to 10.0% of bentonite, 5.0 to 50.0% of finely divided zinc and the balance solvent.

6 Claims, 3 Drawing Figures

STOP-WELD COMPOSITION AND METHOD FOR PRODUCING ALUMINIUM TUBE IN SHEET UTILIZING THE SAME

BACKGROUND OF THE INVENTION

The present invention relates to a stop-weld composition especially for forming a corrosion inhibiting layer on the internal surface of aluminium tube in sheet.

Throughout the specification and appended claims, the percentages used in connection with the composition are all by weight.

Methods are already known by which a plurality of aluminium or aluminium alloy sheets are pressure-welded together with a stop-weld composition sandwiched therebetween in the desired pattern and fluid pressure is thereafter applied to the unwelded portions to inflate or bulge the unwelded portions to a tubular shape. The product thus fabricated will be herein referred to as an "aluminium tube in sheet."

Conventionally known as the above-mentioned stop-weld composition are those predominantly consisting of colloidal graphite and those chiefly composed of titanium dioxide (see U.S. Pat. No. 3,385,716). Stop-weld compositions should be removed by cleaning after the bulging operation but are difficult to completely remove. Graphite, which is a strong cathodic depolarizer, causes electrochemical corrosion in contact with aluminium in the presence of water, so that the use of stop-weld compositions of the former type entails the corrosion of the inner surface of the tube. Although stop-weld compositions of the latter type comprise an electrochemically neutral substance free of such drawback, they are inferior to the former in the weld preventing effect and therefore involve frequent difficulties in the bulging operation.

Aluminium tube in sheets have already found a wide variety of applications in heat exchangers. When they are used for evaporators for refrigerators or the like in which the tube serves as a gas conduit, the internal surface of the tube is not subject to corrosion, whereas when they are applied to radiators, boilers for bath and like household uses and water heaters utilizing solar heat in which the tube serves to pass water containing copper, iron or like heavy metal dissolved therein, corrosion and corrosion pitting will invariably take place, because the electrode potential of aluminium is lower than that of such metal.

In view of the foregoing problems, a method for producing aluminium tube in sheet having a corrosion inhibiting layer on the internal surface of the tube was proposed (see U.S. Pat. No. 3,650,005) In this method, a stop-weld composition containing finely divided zinc is used to form a corrosion inhibiting layer on the internal surface of the tube. However, the stop-weld composition, which also contains graphite, similary poses a corrosion problem owing to the graphite remaining after cleaning.

SUMMARY OF THE INVENTION

To overcome the foregoing problems, this invention provides stop-weld composition for forming a corrosion inhibiting layer on the internal surface of aluminium tube in sheet comprises 2.0 to 50.0% of boron nitride, 0.2 to 10.0% of bentonite, 5.0 to 50.0% of finely divided zinc and the balance solvent.

According to this invention, the stop-weld composition containing no graphite is unlikely to cause corrosion in the internal surface of the tube which would otherwise be attributable to the stop-weld composition remaining on the surface, and the specific ingredients of the composition achieve an outstanding weld preventing effect as will be described later. Furthermore, the finely divided zinc contained in the stop-weld composition is effectively diffused or spread, by being heated, over the internal surface of the tube to form an excellent corrosion inhibiting aluminium-zinc alloy layer on that surface. The corrosion inhibiting aluminium-zinc alloy layer undergoes sacrificial corrosion, thereby preventing development of a fatal hole penetrating through the tubular portion.

The present invention will be described below in greater detail with reference to accompanying drawings.

DESCRIPTION OF THE SPECIFIC EMBODIMENTS

The present stop-weld composition is employed for producing the aluminium tube in sheet having a corrosion inhibiting layer on the internal surface of the tube as follows.

The stop-weld composition is disposed in a predetermined pattern between at least two sheets of aluminium or aluminium alloy (other than aluminium-zinc alloy). The sheets together with the stop-weld composition disposed therebetween are then roll-bonded. A highly pressurized fluid is thereafter forced into the non-bonded portions of the sheets welded together to bulge or distend the non-bonded portions into tubular form. The sheets are heated before or after the distending operation to spread the zinc contained in the stop-weld composition over the internal surfaces of the sheets and to thereby form a corrosion inhibiting aluminium-zinc alloy layer on the surfaces.

Figure 1:
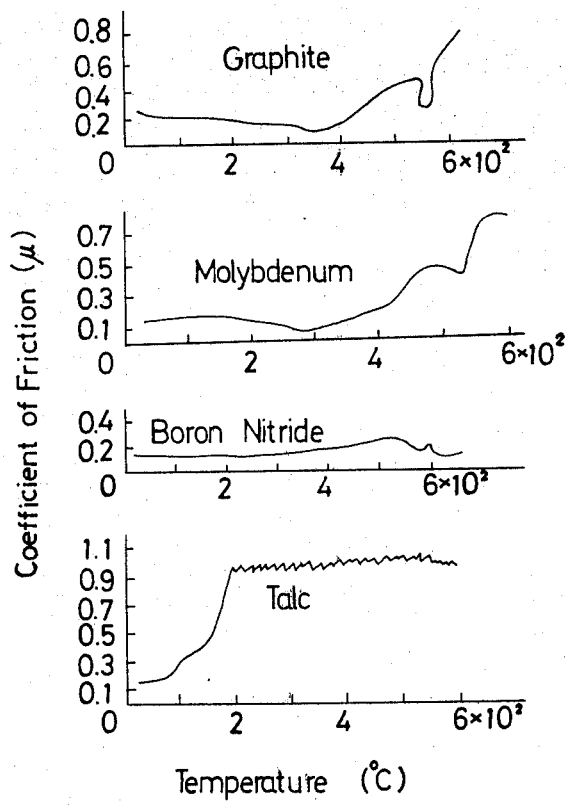
FIG. 1 is graphs respectively showing the releasing abilities in the atmosphere of graphite, molybdenum disulfide, boron nitride and talc varying with changes in temperature.

The boron nitride gives an excellent weld preventing effect. FIG. 1 shows the sheet releasing or separating abilities in the atmosphere of graphite, molybdenum disulfide, boron nitride and talc varying with changes in temperature. Coefficient of friction is plotted as ordinate, and temperature as abscissa. The releasing ability of stop-weld composition can be estimated from the lubricating characteristics and thermal stability of its component. The pressure welding step, namely hot rolling operation, is conducted at about 500° C and, in this connection, FIG. 1 indicates that boron nitride is thermally most stable and has the lowest coefficient of friction, evidencing that boron nitride is an excellent separating or releasing agent. As already mentioned, the amount of boron nitride to be used is 2.0 to 50.0%. If the amount of boron nitride used is less than 2.0%, a sufficient weld preventing effect is not attainable, whereas if it is in excess of 50.0%, the composition is difficult to print on aluminium sheets. It is especially preferable to use boron nitride in the amount of 10.0 to 40.0%.

The bentonite acts to enhance the hydrophilic property of boron nitride. The amount of bentonite to be used is 0.2 to 10.0%, preferably 1.0 to 2.5%. When less than 0.2% of bentonite is used, the stop-weld composition applied may possibly spall upon drying, whilst over 10.0% of bentonite, if used, is objectionable to the weld preventing effect of boron nitride.

Usable as zinc in finely divided form are pure zinc, zinc alloys with at least 90% zinc content and zinc compounds containing a component or components, other than zinc, which are gasified by heating. The amount of finely divided zinc to be used varies in the range of 5.0 to 50.0% with the thickness of the aluminium sheet, the thickness and surface zinc concentration of the zinc-diffused layer, and the use of the tube in sheet to be fabricated. With less than 5.0% of zinc, only a thin zinc-diffused layer of a low surface zinc concentration will result which fails to give sufficient resistance to corrosion. Use of more than 50.0% of zinc increases the surface zinc concentration to excess, permitting corrosion to occur early and rapidly and making it impossible to ensure the desired corrosion inhibiting effect. It is especially preferable to use finely divided zinc in the amount of 20.0 to 25.0%. The corrosion inhibiting aluminium-zinc alloy layer resulting from the diffusion of zinc is useful if it has a thickness corresponding to about 5.0 to 20.0%, more preferably about 10%, of the thickness of one of the aluminium sheets welded together. The thickness of the corrosion inhibiting aluminium-zinc alloy layer is variable by controlling the heating temperature and time for spreading or diffusing the zinc. The heating temperature should be in the range of from 200° C to below the melting point of aluminium. Temperatures below 200° C are not practically useful, since diffusion of zinc will then proceed slowly and a satisfactory zinc-diffused layer is not obtainable. At the melting point of aluminium and higher temperatures, aluminium melts and a zinc-diffused layer can no longer be formed. The heating time, which must be determined in relation to the heating temperature employed, is preferably 1 to 6 hours when heating is conducted in the atmosphere of an oven. Heating time of less than 1 hour fails to ensure uniformity in the surface zinc concentration as well as in the mode of diffusion taking place and is therefore undesirable. Heating for more than 6 hours will not attain significantly better result than would otherwise be available and is accordingly uneconomical in view of operation efficiency.

Water is generally usable as solvent. Addition to water of 2.0 to 20.0% of a organic solvent such as methyl alcohol, ethyl alcohol, isopropyl or acetone is effective in drying the stop-weld composition after printing.

To enhance the adherence of the stop-weld composition to aluminium sheets, the above-defined composition preferably contains 0.5 to 7.0%, more preferably 1.0 to 2.0% of water glass. Use of less than 0.5% of water glass will not improve the adherence, whereas in an amount of over 7.0% the water glass acts adversely on the diffusion of zinc.

For the fabrication of tube in sheet, the aforementioned hot rolling operation is followed by cold rolling operation. As will be apparent from FIG. 1, talc has a high coefficient of friction and poor releasing ability at high temperatures but possesses a high releasing ability at an ordinary temperature like boron nitride. Since talc is less expensive than boron nitride, it may be added to the composition as a filler for effectively preventing welding during cold rolling. It may be also possible to add to to the composition at least one element selected from the group consisting of talc, titanium oxide, magnesium oxide, zinc oxide, kaolin, aluminium oxide and aluminium hydroxide in the total amount of 20.0 to 30.0% simply as usual fillers.

EXAMPLE 1

Figure 2:
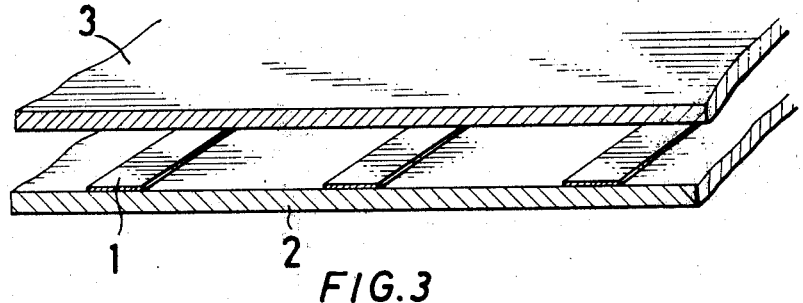
FIG. 2 is a fragmentary perspective view partly in section showing two aluminium sheets before pressure welding.
Figure 3:
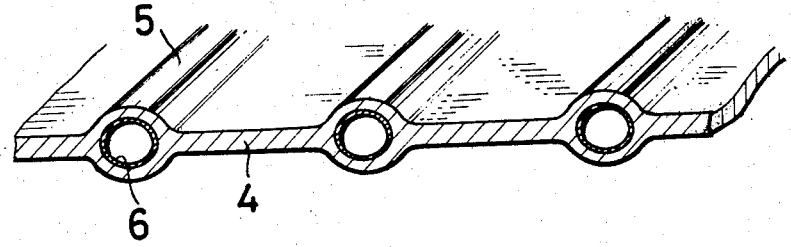
FIG. 3 is a fragmentary perspective view partly in section showing a product.

Referring to FIGS. 2 and 3, a stop-weld composition 1 composed of 33.0% of boron nitride, 1.5% of bentonite, 23.0% of finely divided zinc, 3.0% of water glass and the balance water for forming a corrosion inhibiting layer was printed, in the desired pattern, on an A1100 aluminium alloy sheet 2, measuring 3.75 mm in thickness, 900 mm in width and 500 mm in length, by 100-mesh screen. Another A1100 aluminium alloy sheet 3 of the same thickness was placed over the printed surface. The sheets were hot-rolled at 470° C (reduction: 63%) and were then cold-rolled (reduction: 30%) to join the sheets 2 and 3 together by pressure welding. After annealing the welded sheets at 420° C for 15 minutes, compressed air at 120 atm. was forced in between the unwelded portions to bulge these portions. The unwelded portions, namely the portions between which the stop-weld composition 1 was interposed, were readily separable from each other, and a satisfactory aluminium tube in sheet 4 was obtained. To spread the zinc in the stop-weld composition 1 over the internal surface of the tube 5 formed, the sheet 4 was heated at 500° C for 1 hour, whereby an 80-micron thick, corrosion inhibitng aluminium-zinc alloy layer 6 was formed on the internal surface of the tube 5. The surface zinc concentration of the layer was 1.3%.

EXAMPLE 2

An aluminium tube in sheet was fabricated in the same manner as in Example 1 except that the stop-weld composition consisted of 14.0% of boron nitride, 13.0% of titanium oxide, 6.0% of bentonite, 22.0% of finely divided zinc, 2.0% of water glass and the balance water and that the sheet was heated at 500° C for 2 hours between the hot-rolling and the cold-rolling to spread the zinc in the stop-weld composition over the portion which is to be the internal surface of the tube. The surface zinc concentration of an corrosion inhibiting aluminium-zinc alloy layer was 1.0% and the thickness of the layer was 100 micron.

EXAMPLE 3

An aluminium tube in sheet was fabricated in the same manner as in Example 2 except that the stop-weld composition consisted of 20.0% of boron nitride, 18.0% of titanium oxide, 1.5% of bentonite, 10.0% of finely divided zinc, 2.0% of water glass and the balance water. The surface zinc concentration of an corrosion inhibiting aluminium-zinc alloy layer was 0.4% and the thickness of the layer was 50 micron.

EXAMPLE 4

An aluminium tube in sheet was fabricated in the same manner as in Example 2 except that the stop-weld composition consisted of 14.0% of boron nitride, 10.0% of titanium oxide, 1.5% of bentonite, 30.0% of finely divided zinc, 2.0% of water glass and the balance water. The surface zinc concentration of an corrosion inhibiting aluminium-zinc alloy layer was 2.5% and the thickness of the layer was 200 micron.

EXAMPLE 5

An aluminium tube in sheet was fabricated in the same manner as in Example 2 except that the stop-weld composition consisting of 14.0% of boron nitride, 8.0% of titanium oxide, 10.0% of talc, 1.5% of bentonite, 22.0% of finely divided zinc and the balance water included 20.0% of ethyle alcohol. The surface zinc concentration of an corrosion inhibiting aluminium-zinc alloy layer was 1.0% and the thickness of the layer was 100 micron. The unwelded portions of the welded sheets of examples 2 to 5 were also very easily separable for bulging.

REFERENCE EXAMPLE

Under the same conditions as in Example 1, two aluminium sheets were joined together by pressure welding, with a stop-weld composition sandwiched therebetween to form a corrosion inhibiting layer, the composition consisting of 33.0% of titanium oxide, 1.5% of bentonite, 1.0% of magnesium montmorillonite, 22.0% of finely divided zinc and the balance water. Although compressed air at 120 atm. was forced in between the unwelded portions, it was impossible to bulge the unwelded portions to a tubular shape.

What is claimed is:

1. A stop-weld composition for forming a corrosion inhibiting layer on the internal surface of a tube comprising 2.0 to 50.0% of boron nitride, 0.2 to 10.0% of bentonite, 5.0 to 50.0% of finely divided zinc and the balance solvent.

2. The composition as claimed in claim 1, in which the stop-weld composition has 10.0 to 40.0% of boron nitride.

3. The composition as claimed in claim 1, in which the stop-weld composition has 1.0 to 2.5% of bentonite.

4. The composition as claimed in claim 1, in which the stop-weld composition has 20.0 to 25.0% of finely divided zinc.

5. The composition as claimed in claim 1 further containing 0.5 to 7.0% of water glass.

6. The composition as claimed in claim 1 further containing at least one element selected from the group consisting of talc, titanium oxide, magnesium oxide, zinc oxide, kaolin, aluminium oxide and aluminium hydroxide as fillers.

* * * * *